Jan. 17, 1956  K. F. RICHARDS  2,731,068
TETRAFLUOROETHYLENE POLYMER BONDED
HEAT-RESISTANT FABRIC
Filed Sept. 23, 1950

INVENTOR.
KURT FRED RICHARDS
BY
a. Newton Nuff
ATTORNEY

United States Patent Office 2,731,068
Patented Jan. 17, 1956

2,731,068
TETRAFLUOROETHYLENE POLYMER BONDED HEAT-RESISTANT FABRIC

Kurt Fred Richards, Park Forest, Ill., assignor to E. I. du Pont de Nemours and Company, Wilmington, Del., a corporation of Delaware Application September 23, 1950, Serial No. 186,423

14 Claims. (Cl. 154—2.6)

This invention relates to new polymeric material structures and, more particularly, to laminated substrates impregnated with polymeric materials comprising tetrafluoroethylene units in preponderant amount and a process of preparing same.

Polymers of tetrafluoroethylene and copolymers thereof have found a unique place in the field of electrical insulation where high temperatures which will char most known organic insulating materials are encountered. In the construction of electrical motors, unsupported films of polytetrafluoroethylene have been used as "slot liners" to provide insulation between the conductors and the ground. The "slot liners" must be resistant to high temperatures and must have a certain degree of rigidity as well as cold-flow resistance and cut-through resistance when a conductor is pressed against the insulation. It has been found desirable, however, in this specific field and others, to have available improved structures comprising such polymeric materials and having still greater mechanical strength and better electrical properties.

Laminates of polymeric materials comprising tetrafluoroethylene units in preponderant amount with other materials have been suggested for these purposes, but those heretofore available lack the desirable properties set forth above. For instance, such laminates may be made by coating the surfaces to be joined with a suspensoid of a polymeric material comprising tetrafluoroethylene units in preponderant amount and, before the suspensoid is dry, placing the coated surfaces face-to-face and heating the assembly at 212° F. and then subsequently at or above 621° F. Although this method produces a firm bond between the treated surfaces, when the material to be joined is a fabric, it has not been possible to form an assembly free of voids or air spaces between the threads of the fabric, because the heat applied to dissipate the suspending medium for the polymeric material produces a gas which makes the bonding medium porous. In another method, a preformed film of polymeric material comprising tetrafluoroethylene units in preponderant amount is inserted between two plies of unimpregnated glass fabric and heat and pressure are applied. While the resulting product may be suitable for certain purposes, numerous air spaces will exist between the layers and the laminae are easily separated into the original plies.

Consequently, such prior laminates are unsuitable for use where high dielectric strength is required, as in "slot liners" for electrical motors, or where improved abrasion resistance or improved mechanical strength is desired.

A copending application of Philip F. Sanders, Serial No. 186,446, filed September 23, 1950, discloses a process of producing such improved laminates by arranging in superposed relation a plurality of dry plies of fabric impregnated with a polymeric material comprising tetrafluoroethylene units in preponderant amount and heating the assembled plies under pressure at the fusion temperature of the polymeric material. This produces a unitary structure in which the fabric plies are completely encased or embedded within the mass of polymeric material. However, this Sanders' process is essentially a batch process, and there has heretofore been no practical way of producing laminates of the materials herein described on a continuous basis or in extensive lengths.

It is therefore a primary object of this invention to provide a continuous process for preparing laminates of fabric and polymeric material comprising tetrafluoroethylene units in preponderant amount.

It is another object to provide a continuous process for producing a unitary structure of extensive length of a plurality of glass, asbestos, and/or metal fabric plies and such polymeric material.

It is a further object to provide a process for producing a unitary structure in which such fabric plies are embedded within a mass of polymeric material.

It is a still further object to provide a unitary structure of extensive length of a plurality of fabric plies encased in a polymeric material comprising tetrafluoroethylene units in preponderant amount.

It is an additional object to provide a laminate of extensive length of glass, asbestos, and/or metal fabric and such polymeric material in which there are substantially no voids between the threads of the fabric or air spaces in the laminate.

It is another object to provide a laminate of extensive length of fabric and such polymeric material having improved dielectric strength, mechanical strength, and abrasion resistance.

It is another object to provide a laminate of extensive length of fabric and such polymeric material which may be used as "slot liners" for electrical motors.

It is a specific object to provide a laminate of extensive length of glass fabric and polymeric material comprising tetrafluoroethylene units in preponderant amount.

Other objects will be apparent as the description proceeds.

These objects are accomplished by placing together in superposed relation two or more continuous lengths or plies of fabric, such as glass, asbestos, and/or metal fabric, impregnated with a polymeric material comprising tetrafluoroethylene units in preponderant amount, the impregnant being thoroughly dry, subjecting the plies to sufficient pressure at a temperature considerably below the fusion temperature of the polymeric material to cause the separate plies to be compacted and coherent, and then heating the coherent plies at a temperature above the fusion point of the polymeric material in the absence of any substantial pressure to cause the polymeric material to become welded together.

It is surprising and wholly unexpected that a unitary structure can be produced by first pressing or rolling separate plies together at a temperature considerably below the fusion point of the polymeric material, and then subsequently heating, in the absence of pressure, at or above the fusion temperature.

The pressing or rolling apparently causes the polymeric material to flow so that the plies are intimately compacted and have sufficient coherence to permit subsequent processing without becoming separated, and the subsequent heating causes the impregnant of adjacent plies to become welded together to form an integral unitary structure of the fabric plies and the polymer substantially free of voids. The fusion of the polymer is so complete that the fabric is actually embedded or encased in a mass of the polymer.

It is preferred that the fabric be impregnated with a high solids colloidal dispersion of polytetrafluoroethylene, such as those disclosed in U. S. Patent No. 2,478,229, issued August 9, 1949, to Kenneth L. Berry, or the dilute suspensoids disclosed in copending application Serial No. 713,385, filed November 30, 1946, by Malcolm M. Renfrew, now Patent 2,534,058, and concentrated by the electrodecantation method described in copending application Serial No. 783,389, filed October 31, 1947, by C. K. Ikeda, now abandoned. In any case, the dispersed particles of polymeric material should be of such size and quantity that they readily permeate the fabric and fill the interstices thereof.

Any method of impregnating the fabric before its use in the present invention is suitable, provided that it produces a fabric in which all of the interstices are completely filled. A preferred method of accomplishing this result is disclosed in copending application Serial No. 86,606, filed April 9, 1949, by Philip F. Sanders, now Patent 2,539,329.

For a better understanding of the nature of the objects of this invention, reference may be had to the following description and accompanying drawings in which.

Figure 1:
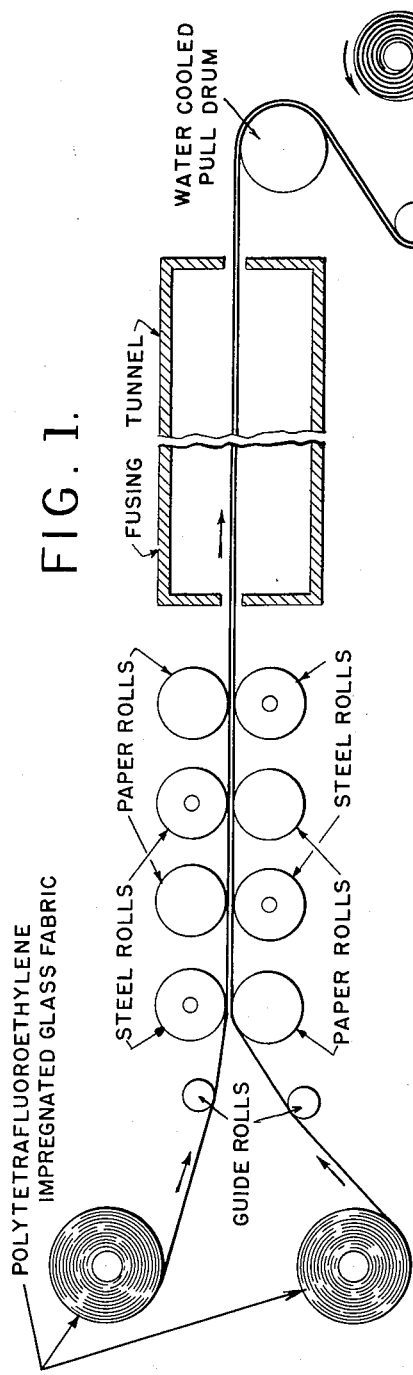
Figure 1 is a schematic arrangement in cross-section of a suitable apparatus for preparing a flexible laminate to be wound in rolls after it emerges from the fusing tunnel.

As shown in Fig. 1, the ends of two rolls of previously impregnated fabric (the impregnant being thoroughly dry) are arranged in superposed relation and fed into the nip of the first set of unheated pressure rolls. This first set of rolls has a steel roll on the top and a paper counter roll on the bottom. After passing through the first set, the superposed plies pass through the second set of rolls in which the steel roll is on the bottom and the paper roll on the top, then through the third set which is like the first, and then through the fourth set which is like the second. As the ends of the superposed plies emerge from the last set of rolls, the continuous coherent assembly is passed through a heating tunnel maintained at a temperature high enough to heat the polymeric material impregnant to at least its fusion temperature, and, as it emerges from the heating zone, it passes over a water-cooled roll, and the finished, firmly bonded product is wound up on a roll.

Figure 2:
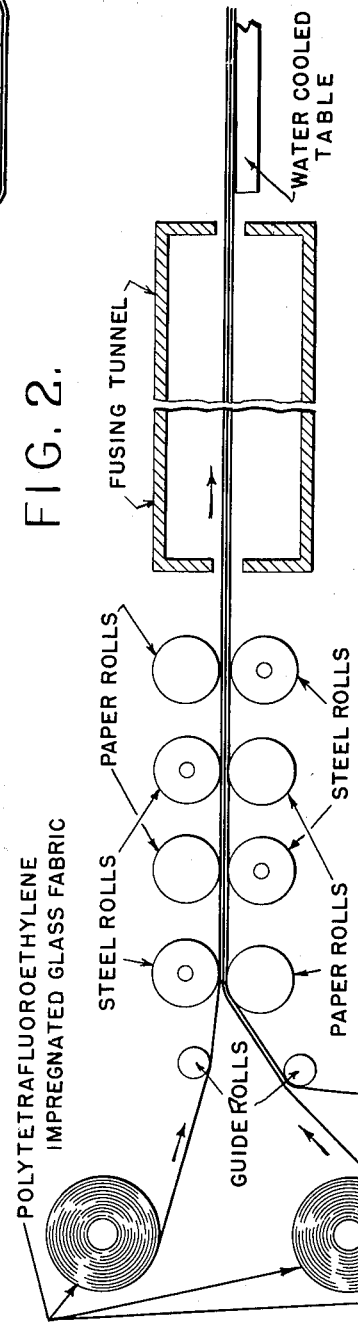
Fig. 2 is a schematic arrangement in cross-section of a suitable apparatus for preparing a relatively stiff or semirigid structure which is too stiff to be wound up in roll form, in which case the laminate is cut to the desired length as it emerges from the fusing tunnel.
Figure 3:
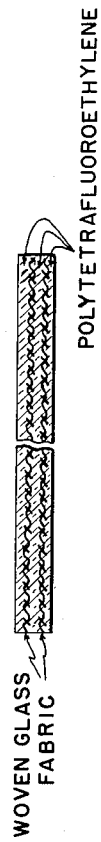
Fig. 3 is an enlarged cross-section of a continuous unitary structure produced by lamination of the plies as shown in Fig. 1.

In the modification shown in Fig. 2, the ends of three rolls of previously impregnated fabric are arranged in superposed relation and fed into the nip of pressure rolls and through a heating zone similar to those shown in Fig. 1. As the firmly bonded, unitary structure emerges from the heating zone, it is passed over a water-cooled table. Since a plurality of plies of this type may result in a fairly rigid structure, it is not always feasible to wind up the product on rolls. For this reason, the continuous product passing over the water-cooled table may be cut into any convenient lengths.

It will be obvious from the herein description that there is no limitation on the length of the plies which may be laminated in the practice of this invention. As a roll of single ply material comes to an end, a new roll may be joined thereto and the process kept in operation without interruption.

The following examples are illustrative of the invention. Throughout the specification the percentages are all expressed on a weight basis.

*Example 1*

A continuous length of a standard square weave glass fabric, identified as Owens-Corning Fiberglas Corporation's ECC-127, and having the following characteristics:

| | |
|---|---|
| Thickness (inches) | .007 |
| Ounces per square yard | 6.00 |
| Yarn: | |
| Warp | 450⅔ |
| Filler | 450⅔ |
| Thread count per inch: | |
| Warp | 42 |
| Filler | 32 | was given three dips in an aqueous suspensoid of polytetrafluoroethylene. The concentration of the suspensoid for the first and second dip was 40% solids, and, for the third dip, the concentration was 60% solids. After each dip, the saturated glass fabric was passed through a heat zone having an air temperature of approximately 180° F. at the entry port and 550° F. at the exit port to evaporate the aqueous suspending medium for the suspensoid. After this heating, the impregnant was fragile and contained microscopic "mud cracks," although the polytetrafluoroethylene particles adhered to themselves and to the glass fabric sufficiently to permit the impregnated fabric to be wound on a 3-inch diameter roll without damaging the material.

The average thickness of the glass fabric after impregnating and drying was .014 inch to .012 inch.

The continuous length of dry, unfused, impregnated glass fabric was cut into three pieces which were then arranged in superposed relation, and the whole assembly was passed between a series of pressure rolls, as shown in Fig. 2, at room temperature. This compacted the plies and made them adhere to each other. The assembly was then passed through a heat zone having an air temperature of 700-800° F., where the impregnant was heated to at least its fusion temperature of 621° F.

After the laminated assembly was cooled, it was cut into suitable lengths having substantially no voids in the entire structure. There were no "mud cracks" in the fused polymeric material, and the individual plies had been firmly bonded into an integral unit which could not be separated into its original components.

*Example 2*

A continuous length of standard square weave glass fabric, identified as Owens-Corning Fiberglas Corporation's ECC-112, and having the following characteristics:

| | |
|---|---|
| Thickness (inches) | .003 |
| Ounces per square yard | 2.09 |
| Yarn: | |
| Warp | 450½ |
| Filler | 450½ |
| Thread count per inch: | |
| Warp | 40 |
| Filler | 39 | was given three dip coats of the aqueous polytetrafluoroethylene suspensoids employed in Example 1. The impregnating and drying operations were carried out in the same manner as described in Example 1, except that the "mud cracks" in the impregnant, formed during the drying operation, were sealed by giving the dry, unfused polytetrafluoroethylene-impregnated glass fabric four passes between a steel pressure roll heated to about 250° F. and a paper counter roll. The pressure on the axis of the steel calender roll against the paper counter roll was 40 tons and the speed was 354 yards per hour. The first and third time the impregnated glass fabric was passed between the pressure rolls one side was in contact with the steel roll and the second and fourth time the other side was in contact with the steel roll. The thus calendered, unfused, impregnated glass fabric was free of "mud cracks" and voids between the separate threads of the fabric.

The continuous length of dry, unfused, impregnated glass fabric was cut into two pieces of equal length and a third piece of somewhat shorter length. These were then arranged in superposed relation, the shorter piece being placed between the two longer pieces with all three pieces alined at one end, and the whole assembly was passed between a series of four sets of pressure rolls, each set consisting of a smooth surface, steel roll, heated at about 325° F., pressing on a smooth paper counter roll as shown in Fig. 1. The sets of rolls were so arranged that in the first and third the steel roll was on the top and in the second and fourth the steel roll was on the bottom. As the laminate assembly passed through the series of rolls, the heated steel rolls were thus alternately on one side and then on the other side of the assembly.

The above-described laminate assembly produced a three-ply structure for the first part of the length of superposed plies and a two-ply structure for the latter part. After rolling, the coherent laminated structure was fused by passing it through a heat zone having an air temperature of approximately 750° F., at atmospheric pressure, and then cooled to room temperature.

Both the two-ply and the three-ply constructions were formed into a highly abrasion-resistant, integral unit which could not be separated into the original plies. The laminates were tested for dielectric strength according to ASTM Method D-149-44, Short Time Test in Air, using a 60 cycle alternating current and ¼ inch brass electrodes with the following results:

|  | Avg.[1] Volts per Mil | Min. Volts per Mil | Max. Volts per Mil | Total Thickness, Inches |
| --- | --- | --- | --- | --- |
| 2-Ply Laminate | 760 | 676 | 850 | .010 |
| 3-Ply Laminate | 778 | 654 | 895 | .015 |

[1] Average of ten readings.

Example 3

A continuous length of a standard square weave glass fabric, identified as Owens-Corning Fiberglas Corporation's ECC-108, and having the following characteristics:

Thickness (inches) _____ .002
Ounces per square yard _____ 1.43
Yarn:
  Warp _____ 900½
  Filler _____ 900½
Thread count per inch:
  Warp _____ 60
  Filler _____ 47 was given three dip coats of the suspensoids described in Example 1 and in a similar manner. The amount of dry polymer deposited corresponded to approximately 4.0 ounces per square yard. After drying, the treated glass fabric was calendered on each side to close the "mud cracks" formed during the drying step in a similar manner to that described in Example 2. Two pieces were then cut from this continuous, dry, unfused, impregnated fabric, were placed together in superposed relation, and were laminated in a continuous manner by feeding them into a series of four sets of pressure rolls followed by a fusing operation in which the laminated material was subjected to an air temperature of 750° F. for a period of 3 minutes with an apparatus similar to that shown in Fig. 1. Each set of pressure rolls consisted of a steel roll heated to approximately 325° F. and a paper counter roll of the type commonly used in calendering and embossing of coated textile materials.

The average thickness of the resulting flexible, unitary structure was .006 inch, and the average dielectric strength was found to be 1,000 volts per mil when tested in the same manner as that described in Example 2.

Example 4

Two more continuous lengths or plies cut from the dry, unfused, impregnated and calendered glass fabric described in Example 3 were arranged in superposed relation, and were placed in a hydraulic press where they were subjected to a pressure of approximately 10,000 lbs./sq. in. at a temperature of 200° F. for a period of 3 minutes. This operation compacted the two plies into intimate contact with each other, and substantially no air spaces or voids existed in the assembly. The separate plies adhered to each other, but they could be readily separated. The assembly was next subjected to an air temperature of 700-750° F., at atmospheric pressure, for a sufficient length of time to heat the polytetrafluoroethylene to at least its fusion temperature (621° F.) and cause the plies to become welded together to form an integral unit. After cooling to room temperature, the two plies were so firmly welded together that they could not be separated into the original plies. The product had an average thickness of .006 inch, was flexible and highly abrasion-resistant, and had good dielectric strength.

Example 5

A continuous length of non-woven asbestos fabric weighing 2.8 ounces per square yard and having an approximate thickness of .008 inch to .010 inch was dip coated by passing it through a 50% aqueous suspensoid of polytetrafluoroethylene to saturate and impregnate the fabric. The impregnated fabric was then heated at approximately 230° F. to evaporate the water. The weight of dry polymer deposited in the fabric was 4.5 ounces per square yard. The continuous length of the dry saturated or impregnated asbestos fabric was passed between pressure rolls heated at approximately 270° F. to smooth and compact the material after which it had a thickness of approximately .008 inch.

The continuous length of dry, unfused, impregnated asbestos fabric was cut into three pieces which were then arranged in superposed relation, and the whole assembly was passed between a series of pressure rolls, as described in Example 2, heated at approximately 275°-300° F. This compacted the plies and made them adhere to each other. The assembly was then passed through a heat zone having an air temperature of 700-800° F., at atmospheric pressure, where the impregnant was heated to at least its fusion temperature of 621° F.

After the laminated assembly was cooled, it was cut into suitable lengths having substantially no voids in the entire structure. There were no "mud cracks" in the fused polymeric material, and the individual plies had been firmly bonded into an integral unit which could not be separated into its original components.

Example 6

Two more continuous lengths or plies were cut from the dry, unfused, impregnated and calendered glass fabric described in Example 3 and were arranged in superposed relation with the end of a continuous length of a single ply of the dry, unfused, impregnated, and calendered non-woven asbestos fabric described in Example 5 interposed therebetween. The assembly was then passed through a series of pressure rolls, as described in Example 2, heated at approximately 275°-300° F. The assembly was then passed through a heat zone having an air temperature of 700-800° F., where the impregnant was heated to at least its fusion temperature of 621° F.

Example 7

A continuous length of woven asbestos fabric, containing 80-85% asbestos (ASTM specification D299-49T) and having the following characteristics:

Thickness (inches) _____ .025
Ounces per square yard _____ 8.0
Thread count per inch:
  Warp _____ 22
  Filler _____ 15 was given three dip coats of a 50% polytetrafluoroethylene aqueous suspensoid which thoroughly impregnated the fabric. The saturated fabric was then dried at 250° F. The weight of the dry polymer deposited in the fabric was approximately 23 ounces per square yard. The average thickness of the woven asbestos fabric after impregnating and drying was .040 inch.

The continuous length of dry, unfused, impregnated asbestos fabric was cut into two pieces which were then arranged in superposed relation, and the whole assembly was passed through a series of pressure rolls, as described in Example 2, heated at approximately 275°-300° F.

This compacted the plies and made them adhere to each other. The assembly was then passed through a heat zone having an air temperature of 700–800° F., where the impregnant was heated to at least its fusion temperature of 621° F.

After the laminated assembly was cooled, it was cut into suitable lengths having substantially no voids in the entire structure. The product was a continuous-length, firmly-bonded, semirigid, unitary structure about .045 inch thick.

All the above examples produced unitary structures which were capable of withstanding severe abrasion, which were substantially free of voids or air spaces, and in which the fabric plies were completely encased within the mass of polymeric material. This latter feature increases the cut-through resistance of the polymeric material and thus prevents loss of insulation when a metal conductor is pressed thereagainst.

It will be obvious that copolymers of tetrafluoroethylene with one or more polymerizable organic compounds containing an ethylenic double bond, such as ethylene, vinyl chloride, vinylidene chloride, and alkyl esters of acrylic and methacrylic acids may be used in place of the homopolymer. When such a copolymer is used, it is preferred to use a copolymer of tetrafluoroethylene and ethylene, and particularly one which contains from 60% to 85% tetrafluoroethylene and 40% to 15% of ethylene.

The minimum temperature at which fusion of polytetrafluoroethylene occurs is 621° F., and that at which fusion of the copolymer occurs is dependent on the proportion and fusion point of the modifying material or materials present, and will be somewhat less than 621° F. The maximum temperature for either type of polymeric material is just below that at which undesirable decomposition occurs.

As shown in Example 1, it is not essential to heat the steel pressure roll during the rolling of the superposed plies to form the compacted laminate. However, when the plies are rolled or pressed together at room temperature, thhe polymeric material does not adhere to itself as tenaciously as it does if the pressure is applied with a slightly elevated temperature, and it is therefore necessary to exercise greater care in handling the material to prevent the plies from becoming separated. For this reason, it is preferable to heat the rolls to about 325° F.

Although not essential in the practice of this invention, it is preferred that the dry, unfused, impregnated fabric be calendered before laminating, as described in Examples 2 and 3. It is also possible to use impregnated fabric in which the impregnant is fused before laminating, and then fused again after being laminated as described herein.

Various combinations are possible in carrying out this invention: all of the plies may be fused or unfused prior to passing them, in superposed relation, through the pressure rolls; or there may be alternate plies of fused and unfused; or one or more outer plies may be fused and one or more intermediate plies may be unfused, or vice versa; furthermore, it is possible to laminate an unsupported film of fused or unfused polytetrafluoroethylene with one or more plies of fused or unfused impregnated fabric.

The examples show laminations of two and three plies. It will be obvious, however, that structures of more than three plies may be produced by the process of this invention. For example, more than three plies may be passed through the rolls at one time, or additional plies may be rolled together, one at a time, before the entire assembly is subjected to the fusion temperature.

It has been found that the dielectric strength per mil thickness of the laminates of this invention increases with the number of separate plies used.

In the preferred embodiment of this invention as shown in Figs. 1 and 2, the fusion operation is carried out immediately following the rolling or pressing together of the separate plies. However, it is possible to roll or press the separate plies together and then transport them to another location for the subsequent fusion operation, there being no limit on the amount of time that may elapse between the rolling or pressing together of the separate plies and the fusion operation. However, care must be exercised in handling the coherent compacted plies before the fusing operation since they are not firmly bonded at this stage, and any separation of the plies before the fusing operation which would result in air pockets or voids in the laminate and loss of dielectric strength should be avoided.

The method of this invention is useful for laminating polymeric material impregnated substrates other than those fabrics described in the examples, such as nonwoven glass fabric, woven asbestos fabric, and metal (woven wire) fabric, the only limitation being that the substrate must be able to withstand the high temperature required for the final fusing of the polymeric material. Siliceous fabrics, and, particularly, glass fabrics, are preferred because of their physical and electrical properties.

Flexible laminates made by this invention may be readily formed into "slot liner" insulation. Such "slot liners" have the much desired "snap-back" of fish paper "slot liners"; they do not lose their good dielectric strength at the crease; they are slippery, which makes for easy loading and more complete filling of the slot cell space; cold-flow and cut-through troubles are minimized; they have excellent mechanical strength and abrasion resistance; and they have a heat resistance of "Class H" (American Institute of Electrical Engineers' scale for heat resistance of electrical insulation).

It is apparent that many widely different embodiments of this invention may be made without departing from the spirit and scope thereof; and, therefore, it is not intended to be limited except as indicated in the appended claims.

I claim:

1. A continuous process of producing a unitary structure which comprises arranging in superposed relation a plurality of continuous plies of woven fabric which have previously been impregnated with a polymeric material comprising tetrafluoroethylene units in preponderant amount and dried, lightly pressing successive portions of the assembled plies to form a coherent structure, and subsequently heating successive portions of the coherent structure at a temperature above the fusion point of the polymeric material in the absence of any applied pressure to weld all of the polymeric material together into a continuous length of laminated material, the fabric being one which will not decompose under the conditions recited.

2. The process of claim 1 in which the impregnated fabric plies are calendered before being arranged in superposed relation.

3. The process of claim 1 in which the fabric is glass.

4. The process of claim 1 in which the fabric is asbestos.

5. The process of claim 1 in which the fabric is wire.

6. The process of claim 1 in which the pressing is carried out at a temperature below the fusion temperature of the impregnant.

7. The process of claim 1 in which the pressing is carried out at 325° F.

8. The process of claim 1 in which the impregnant is polytetrafluoroethylene.

9. The process of claim 8 in which the impregnant of the fabric plies is unfused when the plies are arranged in superposed relation.

10. The process of claim 8 in which the impregnant of the fabric plies is fused when the plies are arranged in superposed relation.

11. The process of claim 8 in which alternate fabric plies have the impregnant fused and unfused when the plies are arranged in superposed relation.

12. The continuous process of producing a unitary structure which comprises impregnating a continuous woven fabric with a colloidal suspension of a polymeric material comprising tetrafluoroethylene units in preponderant amount, drying the impregnated fabric, arranging a plurality of continuous plies of the dry impregnated fabric in superposed relation, lightly pressing successive portions of the assembled plies to form a coherent structure, and subsequently heating successive portions of the coherent structure at a temperature above the fusion point of the polymeric material in the absence of any applied pressure to weld all of the polymeric material together into a continuous length of laminated material, the fabric being one which will not decompose under the conditions recited.

13. The continuous process of producing a unitary structure which comprises impregnating a continuous woven fabric with a colloidal suspension of a polymeric material comprising tetrafluoroethylene units in preponderant amount, drying the impregnated fabric, calendering the dry impregnated fabric on pressure rolls, arranging a plurality of continuous plies of the dry impregnated fabric in superposed relation, lightly pressing successive portions of the assembled plies to form a coherent structure, and subsequently heating successive portions of the coherent structure at a temperature above the fusion point of the polymeric material in the absence of any applied pressure to weld all of the polymeric material together into a continuous length of laminated material, the fabric being one which will not decompose under the conditions recited.

14. The continuous process of producing a unitary structure which comprises impregnating a continuous woven fabric with a colloidal suspension of a polymeric material comprising tetrafluoroethylene units in preponderant amount, drying the impregnated fabric, calendering the dry impregnated fabric on pressure rolls, heating the dry impregnated fabric to the fusion temperature of the polymeric material, arranging a plurality of continuous plies of the dry impregnated fabric in superposed relation, lightly pressing successive portions of the assembled plies to form a coherent structure, and subsequently heating successive portions of the coherent structure at a temperature above the fusion point of the polymeric material in the absence of any applied pressure to weld all of the polymeric material together into a continuous length of laminated material, the fabric being one which will not decompose under the conditions recited.

References Cited in the file of this patent

UNITED STATES PATENTS

| | | |
|---|---|---|
| 2,396,629 | Alfthan et al. | Mar. 19, 1946 |
| 2,412,960 | Berry | Dec. 24, 1946 |
| 2,415,028 | Bosomworth et al. | Jan. 28, 1947 |
| 2,427,183 | Berry | Sept. 9, 1947 |
| 2,478,229 | Berry | Aug. 9, 1949 |
| 2,484,483 | Berry | Oct. 11, 1949 |
| 2,484,484 | Berry | Oct. 11, 1949 |
| 2,488,446 | Swiss | Nov. 15, 1949 |
| 2,497,712 | Auchter | Feb. 14, 1950 |
| 2,539,329 | Sanders | Jan. 23, 1951 |